United States Patent [19]

Verzwyvelt

[11] 4,385,085

[45] May 24, 1983

[54] PROCESS FOR REINFORCING INORGANIC FABRICS WITH FLUOROPLASTICS

[75] Inventor: Scott A. Verzwyvelt, Newbury Park, Calif.

[73] Assignee: Hughes Aircraft Company, Culver City, Calif.

[21] Appl. No.: 316,242

[22] Filed: Oct. 29, 1981

Related U.S. Application Data

[62] Division of Ser. No. 135,608, Mar. 31, 1980, Pat. No. 4,308,325.

[51] Int. Cl.$^3$ .......................... B05D 1/18; B05D 3/02; B05D 3/12; H01M 2/16
[52] U.S. Cl. ........................................ 427/350; 427/57; 427/374.1; 427/385.5; 427/430.1; 429/251; 429/254
[58] Field of Search ................ 429/251, 254; 427/352, 427/353, 354, 385.5, 430.1, 57, 350, 374.1

[56] References Cited

U.S. PATENT DOCUMENTS

| | | | |
|---|---|---|---|
| 3,542,596 | 11/1970 | Arrance | 429/251 X |
| 3,749,604 | 7/1973 | Langer et al. | 429/251 X |
| 4,238,303 | 12/1980 | Fang | 429/251 X |

Primary Examiner—Michael R. Lusignan
Attorney, Agent, or Firm—W. J. Bethurum; W. H. MacAllister; A. W. Karambelas

[57] ABSTRACT

Inorganic-organic composites suitable for use as separators in alkaline storage batteries requiring gas permeability, thermal stability, chemical stability and good structural strength and a process for making them are disclosed. The composites are more thermally stable than prior art separator materials, retain aqueous alkaline electrolytes well and are chemically resistant to 31% KOH solutions at 110° C.

4 Claims, No Drawings

PROCESS FOR REINFORCING INORGANIC FABRICS WITH FLUOROPLASTICS

This is a division of application Ser. No. 135,608, filed Mar. 31, 1980, now U.S. Pat. No. 4,308,325, patented Dec. 29, 1981.

TECHNICAL FIELD

This invention relates generally to the preparation of reinforced inorganic fabrics and more particularly to the reinforcement of wettable inorganic fabrics with non-wettable fluoroplastics.

CROSS REFERENCE TO RELATED APPLICATION

U.S. application Ser. No. 948,119, filed Oct. 2, 1978 now U.S. Pat. No. 4,233,347 for A New Process For Reinforcing Structurally Fragile Inorganic Fabrics by Hong Sup Lim, Howard H. Rogers, and applicant Scott A. Verzwyvelt, discloses a process for reinforcing structurally fragile inorganic fabrics whereby reinforcing polymers are precipitated from polymer-solvent solutions into the interstices of porous inorganic fabrics.

U.S. application Ser. No. 953,511, filed Oct. 23, 1978 now U.S. Pat. No. 4,217,404 by applicant Scott A. Verzwyvelt herein for An Improved Polypropylene Separator for use in Alkaline Storage Batteries and Process for Making Same, discloses a method of rendering intrinsically non-wettable polypropylene separators wettable by treating them with compounds such as polybenzimidazole.

U.S. application Ser. No. 953,523, filed Oct. 23, 1978 now U.S. Pat. No. 4,269,913 by Hong Sup Lim and applicant Scott A. Verzwyvelt, discloses Novel Inorganic Composite Felts Suitable for use in Alkaline Storage Cells and the Process for Making the Same.

U.S. application Ser. No. 128,747 filed Mar. 10, 1980, now U.S. Pat. No. 4,277,547 by applicant Scott A. Verzwyvelt herein for "An Alkaline Battery Separator and Process For Preparing the Same From Inert Organic Polymer Fibers That are Made Wettable With Inorganic Particles" discloses a method of rendering inert non-wettable organic polymeric fibers wettable with inorganic particles and separators prepared therefrom.

Each of the above-mentioned copending applications is commonly assigned to Hughes Aircraft Company, the assignee herein.

BACKGROUND OF THE INVENTION

1. Field of the Invention

This invention is embodied in a novel process for preparing a composite material suitable for use as a separator in alkaline storage batteries. The composite materials prepared in accordance with this invention are comprised of fragile inorganic cloths reinforced with fluoroplastics. Separators intended to be used in the fabrication of alkaline storage batteries for spacecraft applications, e.g. batteries such as nickel-cadmium and nickel-hydrogen batteries, must meet conditions quite unlike these for separators normally used in terrestrial alkaline storage batteries. For example, alkaline storage batteries intended for spacecraft applications must be long lived and are normally sealed cells operating in an electrolyte starved condition for optimized gas recombination. As such they must be gas permeable, chemically resistant to alkaline potassium hydroxide solutions, and wettable by said alkaline potassium hydroxide solutions. In addition, these separators must be mechanically strong in order to withstand mechanical stress incurred during battery manufacturing process and also during spacecraft operations. Preferably these cells should also be light in weight.

2. Description of the Prior Art

There are many approaches to the solution of the problem of preparing composite separators for use in alkaline storage cells. Typical examples of these approaches are disclosed in the teachings of H. Langer et al. in U.S. Pat. No. 3,749,604 for Heat Resistant Substrates and Batteries Separators made therefrom; the teachings of Frank C. Arrance in U.S. Pat. No. 3,861,963 for Battery Separator Construction; the teachings of Nigel I. Palmer in U.S. Pat. No. 3,933,525 for Battery Separator Manufacturing Process; the teachings of Joseph A. Cogliano in U.S. Pat. No. 4,110,143 for Process for Making a Wettable Polypropylene Battery Separator; and the teachings of Phillip Bersting in U.S. Pat. No. 4,122,133, for Material for an Alkaline Cell Separator and Process of Making. Many of the above mentioned teachings have yielded separators which meet with a measure of success. However, this art has not totally satisfied the requirements for alkaline storage cells to be used in spacecraft applications. Generally, these separators of the prior art are either non-wettable, thermally unstable or gas impermeable.

As far as it is known to Applicant, the closest prior art to the present invention is that disclosed in applicant's U.S. Pat. No. 4,233,347 identified above. In this above-mentioned patent, Applicant and his coinventors described a process for reinforcing structurally fragile inorganic fabrics including the materials that are reinforced by the process described below. The prior art process disclosed in U.S. Pat. No. 4,233,347 differs from that of the present invention in that the prior art process of Ser. No. 948,119 describes the use of a polymer solvent solution and the precipitation of the polymer from that solution onto the surface of the fabric to be reinforced. While this latter process has been generally successful insofar as its objectives were concerned, it is not totally satisfactory in that the polymer materials used to reinforce the inorganic fabrics tend to be either not sufficiently stable in the presence of potassium hydroxide or not as thermally stable as desired.

Conventional processing methods are unsuitable for forming composites from inorganic fabrics and fluoroplastics where gas permeability and wettability characteristics are desired in the finished product. For example, attempts to form a molded composite from these materials have yielded a non-wettable gas impermeable material. Therefore, there is a need for a composite material which exhibits all of the above-stated desirable operating characteristics and useful as separators in spacecraft power systems.

SUMARY OF THE INVENTION

The general objective of this invention is to provide a new composite material for use as a separator in the fabrication of alkaline storage batteries intended to be used in spacecraft applications. In accomplishing this objective while avoiding most, if not all, of the disadvantages of the prior art and at the same time retaining the advantages of said art, a new process for reinforcing fragile inorganic cloths with fluoroplastics which manages to retain some of the wettability characteristics inherently found in said cloths and at the same time increase the mechanical strength of said cloths to a level suitable for use as separators in spacecraft alkaline storage batteries has been invented.

The process of this invention yields a fluoroplastic reinforced inorganic composite material that has good mechanical strength, good electrolyte wettability and retention, good chemical stability in potassium hydroxide, excellent thermal stability, and good gas permeability.

In accordance with this process, composites are prepared by causing fluoroplastic particles to be deposited on to and about the fibers of a porous inorganic substrate by immersing said inorganic substrate in a fluoroplastic particle suspension diluted with water, or alternatively, spraying said substrate with fluoroplastic particles, or alternatively, dusting said substrate in dry fluoroplastic powders. After the substrate has been immersed in the particle suspension for an appropriate time, the substrate is then removed from the suspension and blotted to remove any excess suspension. The carrier fluid is removed from the suspension which remains in the substrate by evaporation to thereby leave a fluoroplastic particle coated substrate. The particles on this substrate are then sintered at a chosen elevated temperature to provide a discontinuous reinforcing network about the fibers of the substrate.

It is therefore an objective of this invention to provide a inorganic fabric, reinforced with a thermally stable fluoroplastic, which has good electrolyte retention, good mechanical strength, good thermal stability and good wettability characteristics.

A further objective of this invention is to provide a process for reinforcing a fragile inorganic fabric with polytetrafluoroethylene which does not result in a continuous coating of polytetrafluoroethylene about the fibers of the porous inorganic fabric substrate.

An additional objective of this invention is to provide a process for preparing a composite material consisting of a fragile inorganic fabric reinforced with polytetrafluoroethylene which retains an aqueous electrolyte, is wettable in an aqueous potassium hydroxide electrolyte and is permeable to gases.

A still further objective of this invention is to provide a process for fabricating a separator with good thermal stability to the $O_2$-hydrogen recombination in Ni-$H_2$ batteries and good chemical stability to potassium hydroxide electrolyte.

That we have accomplished the above-stated objectives while avoiding the disadvantages of the prior art and retaining most, if not all, of the advantages of said art will be apparent upon reference to the following detailed description of the invention.

DETAILED DESCRIPTION OF THE INVENTION

This invention describes the treatment of mechanically fragile inorganic substrates of materials such as zirconium oxide with fluoroplastic materials to form novel inorganic-organic composites which exhibit physical and chemical characteristics quite unlike that expected from these materials considered individually.

I have discovered that fragile inorganic fabrics may be reinforced with sintered fluoroplastic particles to yield high strength, gas permeable, thermally stable composites suitable for use as separators in alkaline storage cells intended for use in space craft power systems. These composites, unlike the reinforcing plastics used to prepare them, are wettable in aqueous alkaline solutions, chemically resistant to such solutions and exhibit good electrolyte retention characteristics.

Inorganic materials found to be suitable for use in practicing this invention include, but are not limited to, zirconium oxide-yttrium oxide mixtures, potassium titanate, and thorium oxide. These materials are formed into woven fabrics or substrates that are very porous. Substrates prepared from each of these materials are chemically resistant to aqueous alkaline electrolyte solutions, gas permeable because of their porous nature and characteristically fragile to the point of being structurally weak. Therefore, they must be reinforced in order to render their use as separator components in spacecraft power systems practical.

I have found a way to utilize chemically stable fluoroplastics to reinforce these inorganic substrates without rendering the substrates non-wettable. By the term fluoroplastics, I mean linear hydrocarbon polymers in which some or all of the hydrogen atoms are replaced with fluorine, and are characterized by relatively high crystallinity and high molecular weight. Included in this class of materials are: tetrafluoroethylene, which includes polytetrafluoroethylene (PTFE or TFE), fluorinated ethylene propylene (FEP), chlorotrifluoroethylene (CTFE or CFE), polyvinylidene fluoride (PVF$_2$) and polyvinyl fluoride (PVF). Furthermore, organic polymers such as polyethylene and polypropylene may be used to fabricate separators by this technique where the products are not exposed to excessive temperatures.

The combination of wettable inorganic fabrics with nonwettable fluoroplastics to yield the improved wettable composites of this invention is achieved by a carefully controlled reinforcing technique. I have discovered that a discontinuous layer of fluoroplastic particles whose mean diameters range from about 0.4 to approximately 0.7 micrometers ($\mu$m) can be applied to the porous surface of an inorganic substrate and subsequently transformed into a reinforcing network by controlled sintering of the fluoroplastic particles at elevated temperatures. The distribution of particles should be homogenous and slight. If too many particles are distributed over the surface of the substrate, a continuous film will be formed during the subsequent sintering phase of my process. Films or high densities of fluoroplastic particles would preclude electrolyte contact with the wettable substrate.

To obtain the correct and uniform distribution of reinforcing particles, porous inorganic substrates or fabrics are dipped or immersed into diluted fluorocarbon particle emulsions or sprayed or dusted with the particles. The immersed fabrics are drained and controllably blotted to remove excess particles. If a dusting or spraying technique is used to apply the particles, a fine porous screen is utilized to control the concentration and distribution of the particles applied to the substrate surface. An alternate technique for controlling the concentration and distribution of TFE particles applied to the inorganic substrate is to dust the substrate in a mixture of equal parts of dry TFE particles and a finely ground water soluble salt such as potassium chloride or sodium chloride to provide a TFE-salt coating. The TFE particles are sintered as described below to permanently affix them to the substrate while the salt remains loosely attached and is easily removed.

Having applied a desired discontinuous coating of fluoroplastic particles to an inorganic substrate surface, it then becomes necessary to permanently affix these particles to the surface. I have found that, by carefully sintering the particles, a permanent discontinuous coating is obtained which reinforces the substrate. This phase of my process may be accomplished with a programmable gas chromatographic air oven. The sintering of the particles is critical because excess temperatures will cause undesirable films to be formed and inadequate temperatures will not yield a structurally reinforced material.

The temperature profile for sintering the fluoroplastic particles is dependent upon the type of fluoroplastic, the rheological characteristics of the fluoroplastic, the physical size and form of the individual fluoroplastic particles, the distribution and density of particles on the substrate and upon the form and mass of the substrate. In defining this profile for a specific fluoroplastic reinforcing material, differential scanning calorimetry (DSC) of a sample of the material is used to define its exact melting point (MP) and the temperature distribution of that endotherm.

I then select a temperature at the beginning of the melting endotherm where the material has begun to enter into a solid-liquid transition state, as the maximum sintering temperature and vary the heating rate to, and duration at, that maximum temperature until a desirable sintering temperature profile is obtained. This profile is defined as a heating rate to and duration at a maximum temperature which causes the fluoroplastic particles to soften to the point where they partially fuse, or coalesce, but not to the point where they begin to flow.

The fluoroplastic particle coated porous inorganic substrate is then placed in a gas chromatograph air oven and raised to the selected maximum sintering temperature whereby sintering of the individual particles causes a reinforcing discontinuous network of fluoroplastic to be formed on the inorganic substrate. After completion of the temperature profile, the oven is quickly cooled thereby bringing the reinforced substrate to ambient temperature.

I have utilized TFE suspensions diluted to approximately 0.025 grams of TFE per ml of suspension carrier fluid to coat zirconium oxide fabrics. However, the fluoroplastic particles may be applied to inorganic substrates by spraying or by dusting dry fluoroparticles onto the substrates. Porous inorganic substrates should be selected for use in preparing composites to be used as separators in alkaline storage batteries such as nickel-cadmium or nickel hydrogen cells. The products formed will be gas permeable and exhibit good structural strengths when partially coated with the fluoroplastics.

Specific examples of processes for carrying out this invention are shown below.

EXAMPLE I

A commercially available TFE emulsion, sold by Dupont Chemical Co. of Wilmington, Delaware, under the tradename "Teflon 852–201 Clear" (49% analytical solids) was diluted with water to 5% of its original concentration.

Samples of 15 mil thick zirconium oxide fabric, manufactured by Zircar Corporation of Florida, N.Y. and sold under the trade name of Zyw-15 were immersed in a solid suspension for 5 minutes. Agitation is required to suspend the TFE particles before addition of said fabric. The immersion step should be performed in a container provided with a means for precluding contamination and evaporation of the suspension.

The fabric samples were removed from the suspension and allowed to drain for 5 seconds and then blotted for 30 seconds with Whatmann #1 filter paper in a blotting chamber. This chamber allows for uniform blotting pressure and provides a reproducible technique for making these separators. The remaining solvents of the suspension were evaporated off when the sample was placed on a screen in an air oven at 105° for 4 hours.

The unsintered TFE-inorganic fabric samples were placed in a high precision low thermal inertia programmable air oven. The oven employed was a Hewlett Packard gas chromatograph programmable oven (H. P. Model 5730). The TFE was sintered by programming the oven from 50° to 390° C. at a rate of 8° C./minute and holding the oven at a constant temperature of 390° C. for 4 minutes. The oven was then quickly cooled.

The resultant fabric picked up 2.4% of its weight in TFE. It exhibited good mechanical strength, good electrolyte wettability and retention. Furthermore, after reaction in 31% KOH electrolyte for 17 days at 110° C., there were no detectable changes noted in the physical characteristics of the reinforced fabric.

EXAMPLE II

A Dupont Teflon 852–201 clear emulsion was diluted to 3% of its original solids concentration with water and agitated.

A sample of zirconium oxide felt (Zircar Corp. ZYK-50) was immersed in the diluted emulsion and agitated for 5 minutes by ultrasonic vibration to produce an emulsion coated felt.

The felt was removed from the emulsion, drained, and blotted for 60 seconds as in Example I to remove excess emulsion. The samples were placed on a screen to have any remaining solvents removed by vacuum at 100° C. for 4 hours.

Samples were then placed in the oven of Example I. The oven was programmed to raise the temperature from 50° C. to 388° C. at 8°/minute and held at 388° C. for 8 minutes before being cooled rapidly to ambient temperature.

The finished material exhibited good wettability and retention of electrolyte, improved physical integrity of the felt and good gas permeability which is an inherent characteristic of the felt structure.

EXAMPLE III

Samples of zirconium oxide fabric (Zircar Corp. ZYK-15) are placed in a container with a dry powder TFE (Chemplast Fluoroglide 200). The vessel is closed and mechanically shaken for 2 minutes to assure uniform covering of said fabric.

Said fabric is removed from the powder container and further agitated mildly to remove excess TFE powder.

The samples are then sintered as in Example I.

EXAMPLE IV

Samples of zirconium oxide fabric are dry dusted with TFE powder (Chemplast Fluoroglide 200) by use of air and propellent. The density of TFE is controlled by spraying through fine screens onto the inorganic fabric.

Sinter the samples as in Example I.

EXAMPLE V

A zirconium oxide cloth, (Zircar Corp. 2yK-15) is placed in a container filled with equal parts by weight of dry TFE particles blended with finely ground KCl crystals and agitated as described in Example III to provide a TFE-KCl particle coated substrate.

The TFE particles are permanently affixed to the substrate by placing the particle coated substrate in a programmable air oven and raising the temperature from 50° C. to 392° C. at a rate of 8° C. per minutes. The temperature is maintained at 392° C. for 8 minutes and subsequently quickly cooled to ambient.

After cooling, the KCl crystals are removed from the substrate by immersing the substrate in a water bath and subjecting it to ultrasonic agitation.

As KCl crystals are dissolved in the water bath, the inorganic substrate is left and a discontinuous coating of reinforcing TFE particles attached thereto.

INDUSTRIAL APPLICATIONS

The process and product described above have utility in the fabrication of separators for use in high power high density alkaline storage cells. The process provides a means for forming novel composites, comprising inorganic substrates reinforced with non-wettable plastics, that are wettable in aqueous electrolytic solutions, are thermally stable, relatively light in weight and structurally strong.

Having completely described my invention and provided teachings to enable others to make and utilize the same, the scope of my claims may now be understood as follows.

What is claimed is:

1. A method of reinforcing structurally fragile inorganic fabrics with non-wettable, thermally stable, chemically inert fluoroplastics to provide gas permeable, wettable, chemically resistant, thermally stable composites having good mechanical strength comprising the steps of:
   (a) providing a fabric comprised of inorganic fibers whose surfaces are substantially free of contaminants and surfactants;
   (b) applying a minor coating of fluoroplastic particles to said fiber surfaces; and
   (c) controllably sintering said particles employing a temperature profile defined as a heating rate to and duration at a maximum temperature which causes said fluoroplastic particles to soften to the point where they partially fuse, or coalesce, but not to the point where they begin to flow, thereby causing said particles to permanently adhere to said fibers and provide a discontinuous fluoroplastic matrix which reinforces and strengthens said fabric.

2. The method of claim 1 wherein said fluoroplastic particles are selected from the group consisting of tetrafluoroethylene, chlorotrifluoroethylene, fluorinated ethylene propylene, polyvinylidene fluoride and polyvinyl fluoride.

3. The method of claim 1 wherein said fluoroplastic is tetrafluoroethylene and where said particles are applied to said fiber surfaces by immersing said fabric in an aqueous suspension of tetrafluoroethylene particles and subsequently removing excess particles from said fabric by sequentially draining and blotting said fabric.

4. A process of reinforcing a fragile inorganic substrate with non-wettable, chemically resistant, thermally stable polytetrafluoroethylene to form a wettable, chemically resistant, thermally stable composite having improved mechanical strength comprising the steps of immersing said substrate in a dilute suspension of polytetrafluoroethylene particles whereby said particles are evenly dispersed throughout the interstices of said substrate; removing said substrate from said dilute suspension and sequentially draining, blotting, and evaporating the carrier fluid from said suspension in an air oven or vacuum oven, thereby leaving a substrate evenly coated with discontinuous particles of polytetrafluoroethylene and thereafter sintering said discontinuous particles at a selected temperature ranging from 330° to 450° C. for 3-5 minutes to form a semicontinuous network of polytetrafluoroethylene particles which reinforce said inorganic substrate, thereby increasing the mechanical strength of said substrate.

* * * * *